(12) United States Patent
Lin

(10) Patent No.: US 7,019,776 B1
(45) Date of Patent: Mar. 28, 2006

(54) METHOD AND SYSTEM FOR AUTOMATIC WHITE BALANCING

(75) Inventor: Shang-Hung Lin, San Jose, CA (US)

(73) Assignee: Magnachip Semiconductor, Inc., Santa Clara, CA (US)

( * ) Notice: Subject to any disclaimer, the term of this patent is extended or adjusted under 35 U.S.C. 154(b) by 734 days.

(21) Appl. No.: 10/223,157

(22) Filed: Aug. 16, 2002

(51) Int. Cl.
  *H04N 9/73* (2006.01)
  *H04N 1/46* (2006.01)
  *G06K 9/00* (2006.01)
  *G06K 9/40* (2006.01)

(52) U.S. Cl. .................. 348/223.1; 382/162; 382/274; 358/516

(58) Field of Classification Search .............. None
See application file for complete search history.

(56) References Cited

U.S. PATENT DOCUMENTS

| | | | | |
|---|---|---|---|---|
| 5,351,079 A | * | 9/1994 | Usui | 348/223.1 |
| 5,619,347 A | * | 4/1997 | Taniguchi et al. | 348/223.1 |
| 5,867,286 A | * | 2/1999 | Lee et al. | 382/167 |
| 6,038,339 A | * | 3/2000 | Hubel et al. | 382/274 |
| 6,411,331 B1 | * | 6/2002 | Sansom-Wai et al. | 348/223.1 |
| 6,873,727 B1 | * | 3/2005 | Lopez et al. | 382/162 |
| 6,906,744 B1 | * | 6/2005 | Hoshuyama et al. | 358/516 |
| 6,947,079 B1 | * | 9/2005 | Parulski et al. | 348/223.1 |

* cited by examiner

*Primary Examiner*—David Ometz
*Assistant Examiner*—Nhan T. Tran
(74) *Attorney, Agent, or Firm*—Fernandez & Associates LLP

(57) ABSTRACT

An automatic white balancing method and system. A modification of "color in perspective" white balancing technique is implemented. Rather than a default projection plane used by the typical white balancing technique, the projection plane for a RGB space is automatically selected to allows the projected reference gamuts in the projection plane to be as disjoined as possible, thereby making them as uncorrelated as possible. In turn, automatic white balancing is performed using the color temperature associated with the projected reference gamut most correlated with the projected gamut of an image sensor.

20 Claims, 3 Drawing Sheets

METHOD AND SYSTEM FOR AUTOMATIC WHITE BALANCING

FIELD OF THE INVENTION

The invention relates to image white balancing, particularly to image white balancing that uses statistical analysis.

BACKGROUND

A digital camera is often required to estimate or detect the illumination condition while a user is taking a picture. Then the digital camera needs to perform automatic white balancing in order to compensate for the color deviation caused by the extreme illumination. For example, a white paper under yellow light will be image captured as yellow, even though the desired result is to show the white paper as white. As such, the digital camera should perform white balancing in order to make the white paper look "white" even under the yellow light.

Several auto white balancing techniques have been proposed in the past. Examples include the widely used gray-world algorithm, the RGB max algorithm, neural network approaches, and "color in perspective" approaches.

Among these auto white balancing techniques, "color in perspective" technique is reported to have superior performance. An image sensor's responses are recorded for various color temperatures (light sources), with each color temperature tested with a plurality of different surfaces.

Specifically, as each color temperature is shone on a variety of surfaces, the resulting pixel values sensed by the image sensor can be plotted in a 3-dimensional color space (e.g., a RGB space). As the sensor's response to a particular color temperature, these pixel values can be seen as forming a "gamut" or a cluster in this color space. With a different color temperature, the sensor's response to this color temperature is represented as another gamut (i.e., a cluster) formed in this color space. In turn, the sensor's responses to respectively n color temperatures are represented respectively as n different gamuts in the color space. These resulting "reference" gamuts then serve as references with which to perform white balancing on sensed images.

In theory, as the image sensor captures an image, the pixel values of the captured image also form a gamut for that image in the color space. Out of the n reference gamuts, the reference gamut having the highest correlation with the image's gamut is selected. The color temperature associated with this selected reference gamut is used as the source light for white balancing the captured image.

In practice, before the gamut selection is to take place, buffer limitation necessitates 2-dimensional representations of the n reference gamuts. Also, buffer limitation necessitates a 2-dimensional representation of the gamut that corresponds to the pixel values from the captured image. Information is inevitably lost from this "3D to 2D" projection. Therefore, to select a right direction of the projection is crucial to performing white balancing.

The conventional techniques project the 3D gamuts in the color space onto a 2D "chroma" surface. In other words, luminance information is discarded. However, due to the nature of digital imaging sensors and the characteristics of optical filters, the luminance dimension actually contains considerable information for distinguishing different illuminations (light sources).

For example, one research group discovered that if the gamuts are projected onto the sensor's raw red and blue surface (RB plane) rather than pure chroma surface (ab plane in Lab color space, or uv plane Yuv color space), the color separability is actually improved. However, the RB plane might not be the near-optimal 2D surface onto which to project the reference gamuts. As such, in the present invention, a system and method are proposed to systematically select the near-optimal 2D surface onto which to project the reference gamuts.

BRIEF DESCRIPTION OF THE FIGURES

The accompanying drawings which are incorporated in and form a part of this specification, illustrate embodiments of the invention and together with the description, serve to explain the principles of the invention.

DETAILED DESCRIPTION

Reference is made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
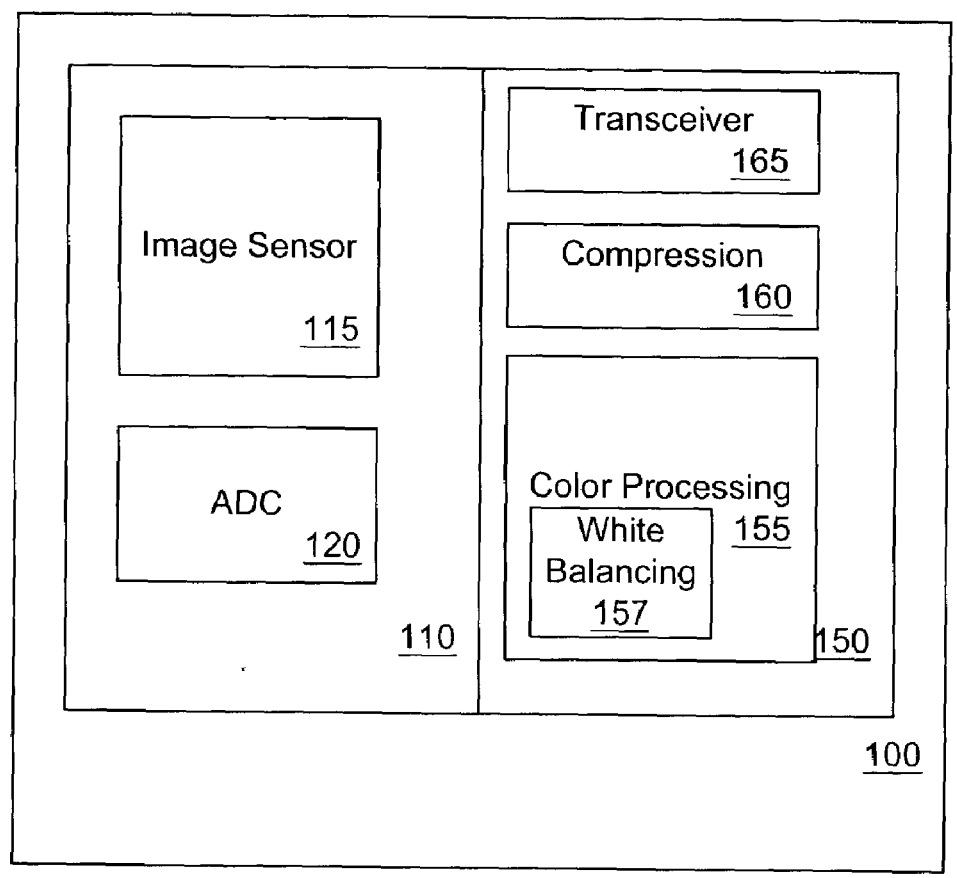
FIG. 1 shows an image sensor chip adapted to perform automatic white balancing in accordance with one embodiment of the invention.

FIG. 1 shows an image sensor chip 100 adapted to perform automatic white balancing in accordance with one embodiment of the invention.

Image sensor chip 100 comprises an image sensor array 110 and an image processing component 150. Image sensor array 110 is adapted for capturing and digitizing images to be processed by image processing component 150. Image sensor chip 100 is typically used within an image capturing device that could be, but is not limited to, a digital camcorder, a digital still camera, a video phone, a video conferencing equipment, a PC camera, a cell phone, or a security monitor.

Image sensor array 110 comprises an image sensor 115, and an analog-to-digital converter (ADC) 120. Image processing component 150 comprises a color processing component 155, a compression engine 160 and a transceiver 165.

Images are captured by sensor 115, then digitized by ADC 120 into pixel values to be transmitted to image processing component 150. The pixel values are color processed by color processing component 155. Color processing component 155 typically performs digital image processing that could include, but is not limited to, auto exposure control, auto white balancing and image sharpening. In turn, the color processed pixel values undergo compression performed by compression engine 160. The compressed image data is then transmitted out of image sensor chip by transceiver 165.

Referring still to FIG. 1, automatic white balancing is performed using a circuit component 157 within said color processing component 155. Upon receiving captured image data to be white balanced, circuit component 157 determines the correlation between a target gamut with each of n reference gamuts. Specifically, the target gamut refers to the set of pixel values representing the image data. The n reference gamuts refer to n set of pixel values that are associated respectively with n color temperatures (i.e., n lighting sources).

In turn, circuitry 157 performs auto white balancing on the received image data by using the color temperature associated with the set of pixel values that is most correlated with the target gamut (i.e., the set of pixel values representing the captured image data). The relationship among color temperatures and their associated sets of pixel values can be stored in a lookup table in memory of image sensor chip 100.

More specifically, the set of pixel values representing the image data are represented as a "target" set (where this set is also called a gamut, or a cluster) of points within a 3-D RGB space. Likewise, each of the n sets of pixel values is represented as a reference set (where this set is also called a gamut, or a cluster) of points within the RGB space. Also, these reference n gamuts of points are associated respectively with n color temperatures.

Each of the n reference sets of points (in the RGB space) can be made up of k subsets of points. For example, a subset of points in reference G(T) (one of the n reference gamuts) can be considered as the response of image sensor 115 to T (one of the n color temperatures coming off a particular surface). Another subset of points within reference gamut G((T) represents the response of image sensor 115 to color temperature T coming off a different surface. As such, if k surfaces are used, then a reference gamut has k subsets of points that together represent the response of image sensor 115 to color temperature T reflecting off these k surfaces. On the other hand, points of the target gamut associated with the image data represent image sensor's response to a scene illuminated by the current color temperature.

In practice, sizes of the above n+1 gamuts are reduced in order to conserve buffer capacity of image sensor chip 100. The reduction is carried out by projecting the n+1 gamuts onto a projection plane, resulting in n+1 projected 2-D gamuts. The n reference gamuts are projected on the projection plane, resulting in n projected reference gamuts. The target gamut is also projected on the projection plane, resulting in a projected target gamut.

In turn, circuit 157 performs auto white balancing on the received image data by using the color temperature associated with the projected reference gamut that is the most correlated with the projected target gamut. That is, white balancing is performed using the color temperature associated with the projected reference gamut having the highest correlation with the projected target gamut. But if high correlation exists among the n reference gamuts, quantifying correlation between the projected target gamut with each of the n projected reference gamuts will not be clear-cut. Thus, in order to correlate as accurately as possible, the projection plane is selected to allow the n projected gamuts to be as uncorrelated as possible. In so doing, quantifying correlation between the projected target gamut with each of the n projected reference gamuts becomes easier and more accurate.

As understood herein, image sensor 115 could be, but is not limited to, a CMOS sensor. Also, conventional compression technique such as JPEG can be performed by compression engine 160. Furthermore, transceiver 165 could be, but is not limited to, a USB transceiver or a wireless transceiver.

Also, as understood herein, the present invention does not need to be implemented with a single chip design above, where the auto white balancing circuit is integrated with the sensor array on a single chip. For example, in another embodiment of the invention, an auto white balancing circuit and a sensor array reside respectively in different chips. In yet another embodiment, an auto white balancing circuit does not even reside within an image capturing device containing a sensor array.

Figure 2:
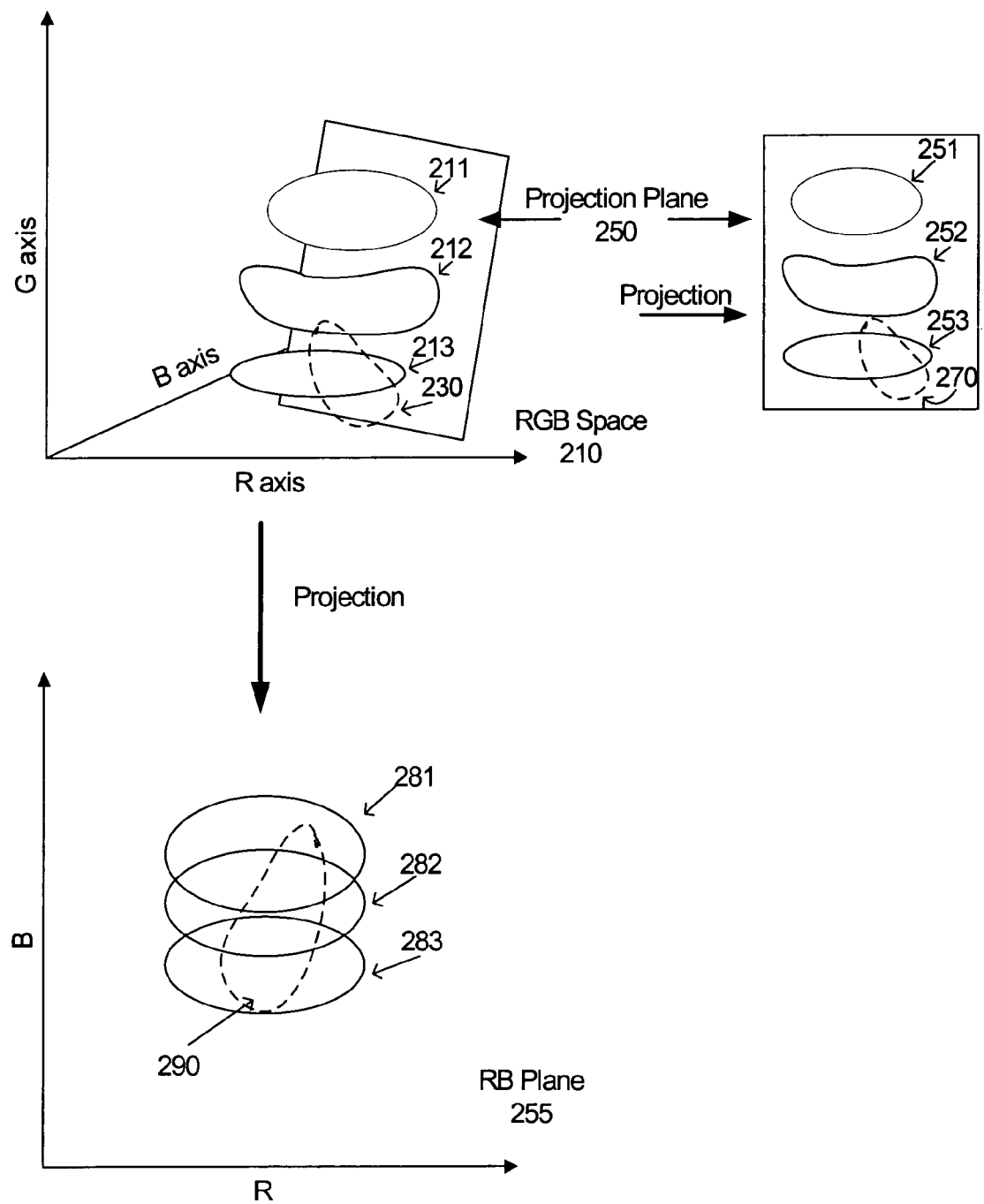
FIG. 2 shows examples of image sensor responses as the reference gamuts corresponding to different color temperatures in accordance with one embodiment of the invention.

FIG. 2 shows an example of image sensor responses as the n reference gamuts corresponding to respectively n different color temperatures in accordance with one embodiment of the invention. For illustrative purpose, n=3. And the color space is a RGB space. However, as understood herein, n can be different from 3 in other embodiments of the invention. The color space can be different from the RGB space in other embodiments of the invention.

In a RGB space 210, n=3 reference gamuts 211–213 are shown. Reference gamuts 211–213 represent respectively 3 color temperatures T1, T2 and T3 (i.e., 3 light sources) that could be used for white balancing the captured image. The points in reference gamut 211 can be thought of as image sensor response to color temperature T1 reflecting from m surfaces. The points in reference gamut 212 can be thought of as image sensor response to color temperature T2 reflecting from the same m surfaces. The points in reference gamut 213 can be thought of as image sensor response to color temperature T3 reflecting from the same m surfaces.

Three projected 2-D reference gamuts 251–253 are formed by projecting reference gamuts 211–213 onto a projection plane 250. Projection plane 250 is selected to achieve the least correlation among projected reference gamuts 251–253. In turn, each of projected reference gamuts 251–253 is compared to a projected 2-D target gamut 270 on projection plane 250.

Specifically, projected 2-D target gamut 270 is formed by projecting onto projection plane 250 a 3-D target gamut 230 (in the RGB space 210) that represents a image sensor response to an image to be white balanced. Next, each of projected reference gamuts 251–253 is compared to 2-D target gamut 270. In turn, the color temperature of the projected reference gamut that is the most correlated with 2-D target gamut 270 is used for white balancing the capture image. For example, out of projected reference gamuts 251–253, if say projected reference gamut 253 is the most correlated with projected target 2-D gamut 270, then the color temperature of projected reference gamut 253 is chosen for white balancing the capture image.

As understood herein, because projection plane 250 is selected to achieve the least correlation among projected reference gamuts 251–253, quantifying correlation between projected target gamut 270 with each of projected reference gamuts 251–253 is easier than an approach that uses a different projection plane or a fixed projection plane.

In contrast, referring still to FIG. 2, if reference gamuts 211–213 are projected onto RB plane 255 as in conventional approaches, then resulting projected reference gamuts 281–283 overlap extensively. As such, quantifying correlation between a projected target gamut 290 with each of projected reference gamuts 281–283 becomes difficult as compared to the above approach that uses optimal or near-optimal projection plane 250.

In general, determining which reference gamut is most correlated with the target gamut can be viewed as a pattern classification problem. Moreover, several techniques can be applied to reduce the dimensionality of the color space such as RGB space 210 to a appropriate projection plane. For example, principle component analysis or neural network can be used.

Specifically, one approach uses the so-called Fisher's linear discriminant method. For a two-class classification problem, the input data vector x (that for example indicates a point of RGB space 210) can be projected to a one-dimensional vector y using $$y = W^T x, \quad W = S_w^{-1}(m_1 - m_2).$$

As understood herein, W is the projection matrix, SW is "within-class" scatter matrix, and $(m_1-m_2)$ is the difference vector between the means (i.e., $m_1$ and $m_2$) respectively of the two classes are applied. The two classes here can be two of the n reference gamuts.

In performing automatic white balancing, due to the fact that color temperatures follow the Planck's blackbody spectral radiation law. The n centers respectively of the n 3-D reference gamuts can be plotted to fit into a trajectory in the 3D color space (e.g., RGB space). The next step is then to use regression analysis to find a 2-D plane that contains most of these n centers.

Once this "trajectory plane" is available, within-class scatter matrix is used to fine-tune the orientation of the "trajectory plane" to obtain a projection plane so that the resulting n projected 2-D reference gamuts are as disjointed (uncorrelated) as possible. Indeed, experiments show that when compared to the chroma plane, the projection plane obtained in the manner above allows better separability between the n projected reference gamuts.

Another method of obtaining a projection plane uses the span of two vectors $(m_L - m_M)$ and $(m_H - m_M)$ as the projection plane, wherein mL is the mean of a reference gamut associated with a low color temperature, $m_M$ is the mean of a reference gamut associated with a mid-range color temperature, and $m_H$ is the mean of a reference gamut associated with a high color temperature. Again, the projection plane obtained is adapted to allow the resulting n projected 2-D reference gamuts to be as disjointed (uncorrelated) as possible.

Figure 3:
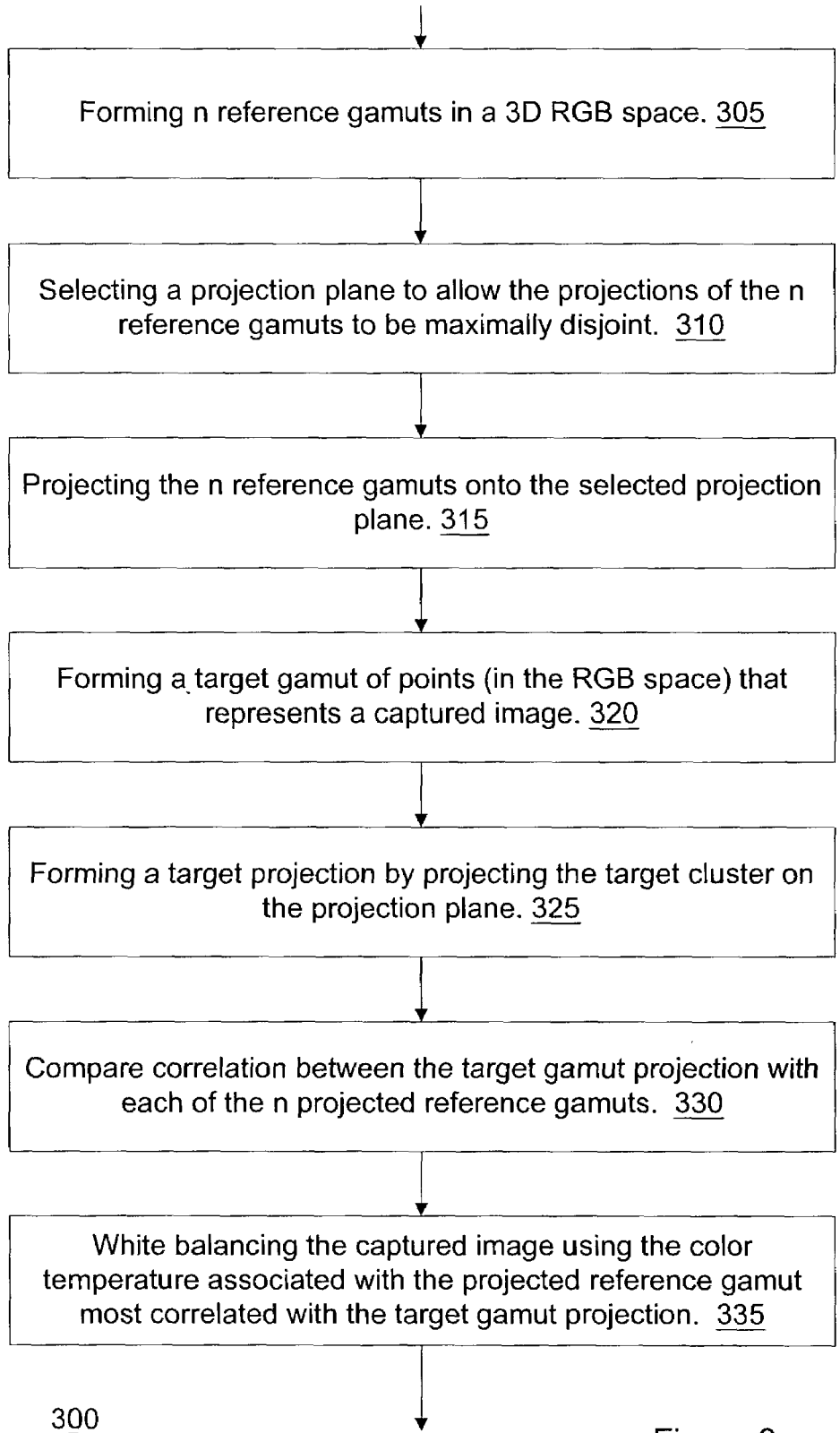
FIG. 3 is a flow chart that outlines steps for performing automatic white balancing on an image in accordance with one embodiment of the invention.

FIG. 3 is a flow chart 300 that outlines steps for automatic white balancing a captured image of an image sensor in accordance with one embodiment of the invention.

In step 305, n reference gamuts are formed in a 3-dimensional color space (e.g., a RGB space). Specifically, for the first gamut, m reflections of a first color temperature as reflected from m different surfaces are used in obtaining respectively m subsets of points in the first reference gamut. The first reference gamut comprises these first m subsets of points. For the second reference gamut, m reflections of a second color temperature as reflected from the same m surfaces are used in obtaining m subsets of points in the second reference gamut. The second reference gamut comprises these second m subsets of points. Similarly, for the j-th reference gamut, n reflections of a j-th color temperature as reflected from the same m surfaces are used in obtaining m subsets of points in the j-th reference gamut. The j-th reference gamut comprises these j-th m subsets of points. As such, for k=1 to n, for the k-th reference gamut, n reflections of a k-th color temperature as reflected from the same m different surfaces are used in obtaining the k-th m subsets of points in the k-th reference gamut.

In step 310, a projection plane is selected onto which to project the n reference gamuts and obtain their respective 2-D projected gamuts. The projection plane can be different from a fixed projection plane used in conventional approaches. The projection plane is selected so that the n 2-D reference gamut projections are as uncorrelated as possible. As such, if the color space is a RGB space for example, the selected projection plane need not be RB plane if the RB plane does not permit the resulting n reference gamut projections to be as uncorrelated as possible. Moreover, different approaches can be used for finding the projection plane, as long as the projection plane allows the n 2-D reference gamut projections to be as maximally uncorrelated, or close to being maximally uncorrelated within an acceptable error bound.

In step 315, n 2-D reference gamut projections are created by projecting the n 3-D reference gamuts onto the selected projection plane. As described above, these n 2-D reference gamut projections are as uncorrelated as possible (or near to being maximally uncorrelated within acceptable error bound) because the projection plane has been determined specifically with the purpose of minimizing their correlation.

In step 320, through image capturing, a "target" gamut associated with the captured image is formed in the 3-D color space.

In step 325, a 2-D target gamut projection is formed on the selected projection plane by projecting the target gamut onto the selected projection plane.

In step 330, the target gamut projection is compared with each of the n reference gamut projections to quantify the n correlations of the target gamut projection respectively with the n reference gamut projections.

In step 335, the color temperature with which to white balance the captured image is selected. Specifically, the selected color temperature is associated with the reference gamut projection that among the n reference gamut projections correlates the most with the target gamut projection.

As understood herein, throughout the detailed description, RGB space can be replaced with another type of color space. Moreover, the foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for white balancing an image captured by an image sensor, said method comprising the steps of:
   a) forming n reference clusters of points in a 3-dimensional color space, wherein said n reference clusters represent said image sensor's response respectively to n color temperatures;
   b) finding within said color space a projection plane on which to project said n reference clusters to form respectively n projected reference clusters that are approximately maximally disjoined;
   c) forming a projected target cluster by projecting onto said projection plane a cluster points in said color space, said target cluster representing said image sensor's response to said captured image; and d) white balancing said captured image with the color temperature associated with one of said n projected clusters that among said n projected clusters has the highest correlation with said projected target cluster.

2. The method of claim 1, wherein said color space is a RGB space.

3. The method of claim 1, wherein each of said n reference clusters comprises m subsets of points, wherein a subset of points for each of said n reference cluster in said color space represents the response of said image sensor to a color temperature reflected from one of m surfaces.

4. The method of claim 1, wherein said step b) comprising the steps of:
   b1) generating in said color space a first vector that is the difference between a vector m(L) and a vector m(M), wherein said m(L) is the mean of one of said n reference clusters having low-range color temperature, and said m(M) is the mean of one of said n reference clusters having mid-range color temperature;
   b2) generating in said color space a second vector that is the difference between said vector m(M) and a vector m(H), wherein said m(H) is the mean of one of said n reference clusters having high-range color temperature; and
   b3) forming said projection plane as the span of said first vector and said second vector.

5. The method of claim 1, wherein said step b) comprising the steps of:
   b1) given n means respectively of said n reference clusters, obtaining a plane X that contain as many of said n means as possible by using regression analysis; and
   b2) forming said projection plane by fine-tuning orientation of said plane X to allow said n projected reference clusters to be as uncorrelated as possible.

6. A method for white balancing an image captured by an image sensor, said method comprising the steps of:
   a) for j=1 to n, forming a reference cluster j of points in a 3-dimensional color space by recording for k=1 to m a subset of points (j,k) in said 3-dimensional color space;
   b) forming n projected reference clusters of points by projecting said n reference clusters onto a projection plane whose orientation in said color space is adapted to minimize correlation among said n projected reference clusters; and
   c) storing said n projected reference clusters in a table adapted to be referenced by said image sensor in white balancing said capture image using the color temperature associated with one of said n projected reference clusters that among said n projected reference clusters has the highest correlation with a projected target cluster on said projection plane, said projected target cluster resulted from projecting onto said projection plane a color space representation of said image sensor's response to said captured image.

7. The method of claim 6, wherein said color space is a RGB space.

8. The method of claim 6, wherein said reference cluster j comprises m subsets of points (j,1), (j,2), . . . (j,n), wherein said subset of points (j,k) for said reference cluster j in said color space represents a response (j,k) of said image sensor to a reflection of a color temperature j reflecting from a surface k.

9. The method of claim 6, wherein said step b) comprising the steps of:
   b1) generating in said color space a first vector that is the difference between a vector m(L) and a vector m(M), wherein said m(L) is the mean of one of said n reference clusters having low-range color temperature, and said m(M) is the mean of one of said n reference clusters having mid-range color temperature;
   b2) generating in said color space a second vector that is the difference between said vector m(M) and a vector m(H), wherein said m(H) is the mean of one of said n reference clusters having high-range color temperature; and
   b3) forming said projection plane as the span of said first vector and said second vector.

10. The method of claim 6, wherein said step b) comprising the steps of:
    b1) given n means respectively of said n reference clusters, obtaining a plane X that contain as many of said n means as possible by using regression analysis; and
    b2) forming said projection plane by fine-tuning orientation of said plane X to allow said n projected reference clusters to be as uncorrelated as possible.

11. A method for image white balancing, said method comprising the steps of:
    in response to receiving an image, forming a cluster in a 3-dimensional color space by plotting the pixel values of said image in said color space;
    forming a projected cluster by projecting said cluster onto a projection plane, said projection plane determined using mathematical method on n mean cluster points of respectively n 3-dimensional reference clusters in said color space, wherein on said projection plane n 2-dimensional projected clusters respectively of said n 3D reference clusters are maximally uncorrelated;
    determining correlation between said projected cluster with each of n projected reference clusters; and
    white balancing said image using the color temperature associated a projected reference cluster most correlated with said projected cluster.

12. The method of claim 11, wherein said color space is a RGB space.

13. The method of claim 11, wherein each of said n reference clusters comprises m subsets of points, wherein a subset of points for each of said n reference cluster in said color space represents the response of said image sensor to a color temperature reflected from one of m surfaces.

14. The method of claim 11, wherein said step b) comprising the steps of:
    b1) generating in said color space a first vector that is the difference between a vector m(L) and a vector m(M), wherein said m(L) is the mean of one of said n reference clusters having low-range color temperature, and said m(M) is the mean of one of said n reference clusters having mid-range color temperature;
    b2) generating in said color space a second vector that is the difference between said vector m(M) and a vector m(H), wherein said m(H) is the mean of one of said n reference clusters having high-range color temperature; and
    b3) forming said projection plane as the span of said first vector and said second vector.

15. The method of claim 11, wherein said step b) comprising the steps of:
    b1) given n means respectively of said n reference clusters, obtaining a plane X that contain as many of said n means as possible by using regression analysis; and
    b2) forming said projection plane by fine-tuning orientation of said plane X to allow said n projected reference clusters to be as uncorrelated as possible.

16. An image sensor chip comprising:
- a memory storing a lookup table that associates n color temperatures to n projected reference clusters on a projection plane within a 3-dimensional color space, said n projected reference clusters being projections respectively of n reference clusters in said color space wherein each reference cluster represents the response of said image sensor chip to a color temperature reflected from m surfaces, said projection plane having an orientation that minimizes correlation among said n projected reference clusters; and
- a sensor array coupled to said lookup table, wherein the representation of a captured image in said color space is projected onto said projection plane to result in a projected sensor response that is correlated with said n projected reference clusters stored in said lookup table, wherein said capture image is white balanced using the color temperature of the projected reference cluster that among said n projected reference clusters is most correlated with said projected sensor response.

17. The image sensor chip of claim 16, wherein said color space is a RGB space.

18. The image sensor chip of claim 16, wherein each of said n reference clusters comprises m subsets of points, wherein a subset of points for each of said n reference cluster in said color space represents the response of said image sensor to a color temperature reflected from one of m surfaces.

19. The image sensor chip of claim 16, wherein said projection plane is obtained using the steps comprising:
- a) generating in said color space a first vector that is the difference between a vector m(L) and a vector m(M), wherein said m(L) is the mean of one of said n reference clusters having low-range color temperature, and said m(M) is the mean of one of said n reference clusters having mid-range color temperature;
- b) generating in said color space a second vector that is the difference between said vector m(M) and a vector m(H), wherein said m(H) is the mean of one of said n reference clusters having high-range color temperature; and
- c) forming said projection plane as the span of said first vector and said second vector.

20. The image sensor chip of claim 16, wherein said projection plane is obtained using the steps comprising:
- a) given n means respectively of said n reference clusters, obtaining a plane X that contain as many of said n means as possible by using regression analysis; and
- b) forming said projection plane by fine-tuning orientation of said plane X to allow said n projected reference clusters to be as uncorrelated as possible.

* * * * *